Patented Nov. 25, 1941

2,263,654

UNITED STATES PATENT OFFICE 2,263,654

PROCESS FOR PREPARING RESINS AND PRODUCTS THEREOF

William J. Sparks, Cranford, and Donald C. Field, Roselle Park, N. J., assignors to Standard Oil Development Company, a corporation of Delaware No Drawing. Application November 19, 1938, Serial No. 241,332

8 Claims. (Cl. 260—80)

This invention relates to novel synthetic resinous polymerization and condensation products containing combined halogen, and to methods for preparing them. It relates more particularly to the preparation of high molecular weight viscous to plastic, soluble products containing high concentrations of combined halogen and to the preparation of such products by subjecting suitable olefin halides or a mixture of such olefin halides and hydrocarbon aliphatic olefins to the action of active polymerization and condensation catalysts at low temperatures.

The improved polymerization and condensation products of this invention contain substantial proportions of combined halogen, corresponding approximately to the amount in the olefin halides reacting. The resulting products have the advantage over separately chlorinated resinous materials in that the chlorine is evenly distributed throughout the molecule and is firmly and uniformly held.

The olefin halides used in this invention have the following structure:

in which X represents a halogen and R a hydrogen atom or an alkyl or aryl group. Examples of such compounds are allyl chloride, 2-methyl 3-chlor propene or methallyl chloride, and other alkyl and aryl halo propenes such as 2-ethyl 3-chlor propene, 2-propyl 3-chlor propene, 2-ethyl 3-brom propene, 2-phenyl 3-chlor propene and 2-naphthyl 3-chlor propene. The preferred alkyl halo propenes are the chlorides having from one to six carbon atoms in the alkyl group while the preferred aryl halo propenes are chlorides containing a phenyl or naphthyl group which may itself be substituted. The aryl groups of such compounds may contain substituent groups attached to the aromatic nucleus such as alkyl, sulfate, amino or hydroxy groups.

It has been found that these olefin halides may be polymerized by the action of metal halide catalysts of the type used in the Friedel-Craft synthesis. The reaction is conducted at low temperatures below zero °C. to —10° C. and preferably at much lower temperatures such as —40 or —50 to —80° C. The catalyst is preferably dissolved in a suitable organic liquid which is substantially inert under the conditions of the reaction, for example, aluminum chloride dissolved in ethyl chloride has been found particularly effective in the processes of this invention.

It has also been found that valuable chlorine-containing co-polymers of high molecular weight, which are also viscous to plastic, soluble products, can be formed by conducting the above-described reaction in the presence of low molecular weight olefins, preferably iso-olefins such as isobutylene.

Instead of isobutylene, other iso-olefins capable of polymerizing in a manner similar to the isobutylene may be used, such as 2-methyl butene-1, etc. Generally it is desirable to use such iso-olefins having not more than about seven carbon atoms. Although it is preferred to use such iso-olefins on account of their particular adaptability for polymerizing to extremely high molecular weight polymers, it is possible to use other readily polymerizable low molecular weight olefins, such as propylene or alpha or beta butylene or substituted olefins such as vinyl ethyl ether.

The following examples are presented to illustrate suitable methods for preparing the improved resinous products of this invention.

Example I

Ten volumes of methallyl chloride were diluted with twenty volumes of ethyl chloride ($C_2H_5Cl$) and the mixture was cooled with powdered carbon dioxide snow to —78° C. Four volumes of a concentrated solution of aluminum chloride in ethyl chloride, prepared at the boiling point of ethyl chloride, was cooled to —78° C. and then added rapidly to the first mixture with stirring. A precipitate formed immediately which redissolved on standing for two hours. The reaction mixture was then diluted with alcohol to remove the catalyst and was permitted to warm up to room temperature thereby removing the ethyl chloride by evaporation. The residue was then dissolved in benzol and precipitated by the addition of ethyl alcohol. This procedure was repeated several times, yielding a product which was a pliable, rather hard resin which softens considerably upon heating to about 200° F. The resin is of dark brown color and is soluble in liquid hydrocarbons, such as benzene, gasoline, and in other solvents, such as carbon tetrachloride and chloroform. It is insoluble in ethyl alcohol, water and acetone.

Example II

Twelve parts by weight of isobutylene and nine parts of methallyl chloride were cooled with powdered carbon dioxide snow and diluted with an equal volume of propane. Five parts of a concentrated solution of aluminum chloride in ethyl chloride, prepared at the boiling point of ethyl chloride was cooled to —78° C. and then added slowly with stirring to the first mixture. A vigorous reaction ensued. After three minutes the reaction mixture was diluted with alcohol to remove the catalyst and was permitted to warm up to room temperature, thereby removing the ethyl chloride by evaporation. The residue was then dissolved in benzol and precipitated by the addition of ethyl alcohol. This procedure was repeated several times, the product finally precipitating from acetone being dried by heating in an oven at 100° C. This product was a water-white pliable, plastic solid having rubber-like properties. It gave a positive Beilstein test for chlorine. It is soluble in solvents such as benzene, gasoline, and carbon tetrachloride. It is insoluble in ethyl alcohol, water, and acetone.

The products prepared according to this invention have extremely high molecular weights, generally above about 1000 and usually of much higher molecular weight of the order of 5000 to 50,000. It is believed that these products are characterized by the long carbon chain structure characteristic of the extremely high molecular weight polymers of isobutylene. For example, the products obtained by polymerization of methallyl chloride apparently have the following structure:

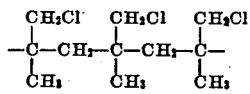

while the co-polymers prepared from methallyl chloride and isobutylene apparently have the following structure:

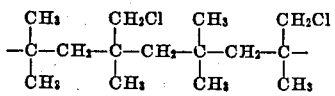

Both the methallyl chloride polymers and the co-polymers are characterized by the presence of chlorine in the primary positions only.

As the catalyst, instead of using aluminum chloride, other volatilizable Friedel-Crafts metal halides having a similar catalytic influence on polymerization and condensation reactions may be used, as, for instance, aluminum bromide, aluminum iodide, titanium tetrachloride, and the like, or complexes of these catalysts with organic compounds, such as ethyl chloride. Other compounds which may be used as solvent or as a medium to form complexes with the catalysts include methyl chloride, isopropyl chloride, chloroform, sulfuryl chloride ($SO_2Cl_2$), carbon disulphide, and many polar organic compounds.

In preparing the preferred type of catalyst, such as the $AlCl_3$—$C_2H_5Cl$, it is best to dissolve the aluminum chloride in ethyl chloride at room temperature because it is relatively insoluble at the operating temperatures, e. g., below —50° C. as shown by the solubility data in the table here below:

*Solubility of aluminum chloride in ethyl chloride*

| Sample | Temp. | Contact time | $AlCl_3$ dissolved |
| --- | --- | --- | --- |
| | °C. | Minutes | Per cent |
| Ethyl chloride and excess aluminum chloride | —78 | 60 | 0.1 |
| Do | —45 | 45 | 0.1 |
| Do | 0 | 180 | 4.4 |
| Do | +8 | 60 | 5.4 |
| Do | +12 | 180 | 7.4 |

After a substantial amount of aluminum chloride has been dissolved in desired amount up to the saturation point, the solution, if not already of the proper concentration, may be adjusted by dilution with further solvent and then cooled down to the desired temperature for the catalytic co-polymerization. If desired, the $AlCl_3$—$C_2H_5Cl$, either separated as such or else dissolved in ethyl chloride, may be dissolved in or diluted with other solvents or diluents, such as methyl chloride, chloroform, etc.

In carrying out both the polymerization and the copolymerization reactions described above, one suitable procedure is to mix the materials to be polymerized in the desired proportions, either alone or with a suitable solvent, diluent, or refrigerant, such as liquefied ethylene, and then add the catalyst, such as a 5% solution of aluminum chloride in ethyl chloride, either alone or dissolved in a suitable diluent such as liquefied ethylene. The use of liquefied ethylene for the several purposes mentioned has an additional advantage that it serves simultaneously as refrigerant to maintain the desired low temperature by absorption of the heat of polymerization by boiling off some of the liquefied ethylene. If desired, the cooling may be effected by either internal or external cooling coils through which a suitable refrigerating liquid is passed or by having the reacting liquids fed into a pipe, coil, or other condenser immersed in a suitable refrigerated bath. However, instead of using such a vaporizable diluent or solvent, dry ice (solidified carbon dioxide) may be used as refrigerant merely by adding pieces of it to the reaction vessel. Owing to the desirability of maintaining a low temperature, it is preferred to have the catalyst, as well as the reactants, pre-cooled to a temperature at least as low as the desired operating temperature. If dry ice is used as refrigerant, the operating temperature is about —78° C., whereas if liquefied ethylene is used as refrigerant, an operating temperature of about —95° C. is maintained (ethylene alone boils at —103° C.). It is possible to use even lower temperatures by using liquefied methane or mixtures thereof with other hydrocarbons.

If desired, the reaction may be carried out under pressure, either just sufficiently above atmospheric to keep the reactant and solvent in the liquid phase or considerably higher pressures may be used, such as up to 10, 20, or 50 atmospheres or more.

In the preparation of co-polymers, the proportions of the materials to be co-polymerized may vary over wide limits without departing from the scope of the invention. The content of combined chlorine in the co-polymer can thus be controlled by regulating the amounts of methallyl chloride and of isobutylene used in the mixture subjected to co-polymerization, the amount of chlorine in the finished product bearing a direct ratio to the proportion of methallyl chloride to isobutylene in the reacted mixture.

The products of this invention are soluble in hydrocarbon oils, generally, and the blends thereof with hydrocarbon oils have many advantages. The polymers are extremely effective, for example, in raising the viscosity and viscosity index of hydrocarbon oils when added thereto in small proportions of the order of a few per cent. They may be used within the limits of their solubility as thickening agents for gasoline and other motor fuels, burning oils, and lubricants. They also serve as plasticizing agents for solid hydrocarbon compositions, such as waxes, asphalts, and the like. In lubricating oils they have the especial advantage of decreasing the change in viscosity of the oil with rise in temperature. This is illustrated in the following example:

Example III

Two per cent by weight of the co-polymer of methallyl chloride and isobutylene, prepared as described in Example II, was added to an S. A. E. 20-W petroleum lubricating oil. The viscosity characteristics of the original oil and the resulting blend are given in the following table:

|  | Saybolt viscosity, seconds | | Viscosity index |
| --- | --- | --- | --- |
|  | 100° F. | 210° F. |  |
| S. A. E. 20-W | 276 | 45.9 | 13 |
| S. A. E. 20-W+2% co-polymer | 518 | 62.6 | 91 |

The products of this invention may also be added in small amounts, of about 0.05 to 10% by weight, to lubricating greases and are very effective in imparting stringy and adhesive characteristics to such greases, including lime, soda, aluminum, and mixed bases.

An illustration of the use of these products in greases is given in the following example:

Example IV

Dissolve 10% by weight of a co-polymer of isobutylene and methallyl chloride, prepared as in Example II, in a mineral lubricating oil of high viscosity index by stirring and heating to 200° F. After complete solution, add 1% of this solution to a lubricating soap grease, such as a mixed base soap of aluminum and sodium stearate dispersed in a hydrocarbon lubricating oil, by stirring at between 90 and 100° F. In the case of heavier greases, slightly higher temperatures may be used to facilitate the mixing.

The resulting greases have excellent adhesiveness to metal surfaces and cannot be wiped off of such surfaces without using much greater pressure than is required for wiping the same uncompounded greases cleanly from the metal surfaces. The greases maintain their improved adhesiveness even at low temperatures of the order of $-10°$ F. and lower.

The addition of the products of this invention to lubricating oils and greases, as described above, also increases the ability of such lubricants to carry heavy loads and renders them effective lubricants under the conditions of extreme pressure encountered in the lubrication of hypoid gears and the like. Sulfur and organic sulfur compounds may also be added to such lubricants or the polymerization and co-polymerization products described herein may themselves be sulfurized, as by heating with sulfur or sulfur chloride.

The halogen content of the polymerization and co-polymerization products of this invention can be increased by halogenation of such products. For example, these products may be chlorinated by a direct reaction with chlorine either in gaseous or dissolved state. The chlorination is preferably carried out with the products dissolved in an inert solvent, such as carbon tetrachloride. Chlorine may be bubbled through this solution under atmospheric pressure or at higher or lower pressures, or the solution may be passed in a thin film or spray through a chamber filled with chlorine gas. The chlorination may be conducted in the absence of light or other catalyzing influence, or it may be conducted in the presence of sunlight or even stronger sources of ultra-violet light, such as a mercury vapor lamp, or in the presence of light of a carbon arc lamp, or of other light of any desired wave length, or in the presence of other catalysts, such as iodine, antimony halides, and ferric chloride, or of peroxides, such as benzoyl peroxide, which directs the halogen atoms preferentially to the alpha (end) carbon atoms in the molecule. Mixtures of such catalytic influences may also be used.

Suitable temperatures for the chlorination include from about $-50$ to $100°$ C. and range preferably from between about $-25°$ C. and the boiling point of carbon tetrachloride, about 78° C. For temperatures below the melting point of carbon tetrachloride, a mixture such as one part of carbon tetrachloride and three parts of chloroform may be used. By these means products having chlorine contents as high as 50 to 75% are prepared, depending upon the intensity of the chlorination conditions and the time of exposure of the materials to be chlorinated.

If desired the products may be freed from any corrosive constituents, such as free chlorine or decomposition products that may be present, by incorporating therewith a basic material which may also serve as a stabilizer, such, for example, as an aromatic amine, monoethyl aniline, methyl naphthylamine, or a quarternary ammonium base, such as tetramethyl ammonium hydroxide. The products may also be washed with an alkaline solution, such as a 10% solution of sodium hydroxide or sodium carbonate.

The polymerization and co-polymerization products of this invention, whether subjected to additional halogenation or not, are stable toward sunlight and artificial ultra-violet light, air, hot and cold water, and chemical agents, such as solutions of acids, bases, and salts.

The polymerization and co-polymerization products of this invention have the characteristics, depending on their molecular weight, of viscous liquids to plastic elastic solids. Increasing the halogen content of these products, as by chlorination, increases their toughness, chlorinated products of high molecular weight and having chlorine contents as high as 60 to 75% being obtained in the form of brittle solids or powders.

The co-polymers of methallyl chloride and isobutylene are soluble in the following solvents:

Diphenyl oxide
"Vistone" (isopropyl ester of fatty acids produced by oxidation)
Benzene
Toluene
Xylene
Nitrobenzene
Ethyl benzene
Sec-butyl benzene
Pyridine
Mono chlorbenzene
Carbon tetrachloride
Chloroform
Mono amyl naphthalene
Dimethyl naphthalene
"Dowtherm A" (diphenyl oxide and diphenyl)
Sec-hexyl chloride
Tetrachlorethane
Turpentine
Tetralin
Trimethyl aniline These co-polymers are partially soluble in higher ketones (of higher molecular weight than acetone), diethyl ether, and higher molecular weight esters, such as the organic esters of cellulose, and are not soluble in:

Methanol
Ethanol
Isopropyl alcohol
Butanol
Tert-amyl alcohol
Sec-hexyl alcohol
Heptyl alcohol
Benzyl alcohol
Ethylene glycol
Triethyl aniline
Sec-butyl ethyl ether
N-butyl ether
Di-isopropyl ether
Tert-butyl ethyl ether
Ethyl lactate
Isopropyl lactate
Butyl lactate
Ethyl oxalate
Triethyl citrate
Ethyl aceto acetate The polymers of methallyl chloride have in general the same solubility characteristics as the co-polymers, but are less soluble in simple oxy-organic solvents of low molecular weight, such as acetone, ethyl ether, ethyl acetate, etc.

The polymers and co-polymers of this invention may be compounded with the following resinous, asphaltic, and waxy materials:

Drying oil-modified alkyd resin
Hydrocarbon resins from petroleum oils
Run Congo copal
East India gum
1 Singapore damar
Batu East India
Cyclopentadiene resin
Modified phenolic resin
Alkyd maleic resin
Ester gum
Rosin
Limed rosin
Polystyrol
Pure phenolics
Poly indene
Utah gilsonite
Coal tar
Araclors (chlorinated diphenyl resins)
Tallow
Stearine pitch
Beeswax
Halowax
Chlorinated paraffin wax
Carnauba wax
Spermaceti wax
Stearic wax
Chinese insect wax
Japan wax
Ozokerite wax
Candleilla wax
Montan wax
Cumar
Polyvinyl acetate
Benzyl cellulose
Methyl methacrylate
Parex resin
Asphalt
Ceresin wax
Lauryl alcohol
Stearyl alcohol
Cetyl alcohol
Oleic alcohol
Chlorinated rubber They are partially compatible with ethyl cellulose and are incompatible with:

Cellulose acetate
Gum elemi
Shellac
Manila gum
Polyvinyl chloride

The polymers and co-polymers of this invention may be compounded with the following materials commonly used as plasticizers:

Dimethyl phthalate
Diethyl phthalate
Dibutyl phthalate
Tributyl phosphate
Triphenyl phosphate
Tricresyl phosphate
Dibutyl tartrate
Butyl stearate
Amyl stearate
Amyl oleate
Raw castor oil
Raw linseed oil
Raw tung oil
Raw soy bean oil
Raw cottonseed oil
Raw sardine oil
Raw perilla oil
Raw rape seed oil
Methyl phthalyl ethyl glycollate
Butyl phthalyl ethyl glycollate
Methyl cyclohexyl adipate
Benzyl benzoate
Triacetin
Butyl acetyl ricinoleate
Camphor
Blown linseed oil
Boiled linseed oil
Boiled tung oil
Blown soy bean oil They are incompatible with linseed oil fatty acids and with tung oil fatty acids.

As indicated above, the polymerization and co-polymerization products of this invention are high molecular weight hydrocarbons containing substantial proportions of combined halogen and are either viscous liquids or solids or substances of, more or less, intermediate characteristics in the nature of plastic solids, depending on the nature of the original material treated, the duration and type of treatment, and the extent of any further halogenation. These products may be used for a wide variety of purposes. For example, they may be used as fire-resistant agents, for impregnating various types of porous or fibrous materials, such as cloth, paper, and building materials. They may also be mixed with inert organic materials and added to solutions of artificial silk for the purpose of delustering the silk product. They may also be incorporated with wax and used for impregnating wood for preservation purposes.

They are soluble in many volatile solvents which are used in the preparation of coating compositions of various kinds, and may be used therewith, alone, or in conjunction with other materials, such as drying oils, pigments, and the like, in the preparation of paints, varnishes, lacquers, enamels, etc.

The polymers prepared according to this invention may be employed as plastics, adhesives, resins, impregnating or coating materials, table coatings, insulating compounds, lubricating oil thickeners, etc., or they may be added in proportions of 5, 10, 50 or even 95% to rubbers such as natural rubber, polychlorprene, polyolefine sulfide type rubber, ethylene dichloride-benzol type rubber, polysulfones, polystyrol, polyvinyl compounds, polyacrylates, polydiolefines, chlorinated or fluorinated polymers, resins, cellulose compounds, rubber hydrochlorides or haloformed rubbers of the "Pliolite" type. They may be vulcanized with the above compounds to give rubbery or ebonite-like products.

The halogen atoms attached to the polymer or co-polymer may also be subjectd to metathetical reactions to give modified products having hydroxyl, nitrile, mercaptyl, or ester groups in place of the chlorine atoms.

This invention is not to be limited to any specific examples or theoretical explanation presented above, all such being intended solely for purpose of illustration, but is to be limited only to the following claims in which it is desired to claim all novelty insofar as the prior art permits.

We claim:

1. Process for preparing improved viscous liquid to solid resinous products, comprising polymerizing an olefin halide represented by the formula,

in which X represents a halogen and R represents a substituent selected from the group consisting of a hydrogen atom, an alkyl, and a halide group, at a temperature below about 0° C. in the presence of a volatilizable halide catalyst of the Friedel-Crafts type.

2. Process according to claim 1 in which the said polymerization reaction is conducted in the presence of a solution of a volatilizable halide catalyst of the Friedel-Crafts type in an organic liquid solvent.

3. Process according to claim 1 in which the said polymerization reaction is conducted at a temperature below about —40° C.

4. Process for preparing improved viscous liquid to solid resinous products, comprising polymerizing an olefin chloride represented by the formula,

in which R represents an alkyl group, at a temperature below about —40° C. in the presence of a solution of aluminum chloride in a hydrocarbon chloride solvent.

5. Process according to claim 4 in which said hydrocarbon chloride solvent is ethyl chloride.

6. Resinous products containing combined halogen and having the properties of viscous liquids to solids of high molecular weight, produced by polymerization of an olefin halide represented by the formula,

in which X represents a halogen and R represents a substituent selected from the group consisting of a hydrogen atom, an alkyl, and an aryl group.

7. Resinous products containing combined chlorine and having the properties of viscous liquids to solids of high molecular weight, produced by polymerization of an olefin chloride represented by the formula,

in which R represents an alkyl group.

8. Resinous products according to claim 7 in which said olefin chloride is methallyl chloride.

WILLIAM J. SPARKS.
DONALD C. FIELD.